Patented Aug. 4, 1925.

1,548,763

UNITED STATES PATENT OFFICE.

GEORGE L. SLEIGHT, OF BALTIMORE, MARYLAND.

SHINGLE AND SHEET-ROOFING COMPOSITION.

No Drawing. Application filed April 19, 1923. Serial No. 633,320.

*To all whom it may concern:*

Be it known that I, GEORGE L. SLEIGHT, a citizen of the United States, residing at Baltimore, in the State of Maryland, have invented certain new and useful Improvements in Shingle and Sheet-Roofing Compositions, of which the following is a specification.

The object of my invention is to produce a composition for the formation of shingles and sheet roofing, that can be rolled or pressed into any desired size or thickness for use on buildings as shingles or roofing, and which is thoroughly water-proof and practically indestructible from weather or climatic conditions.

My composition consists of a mixture of pitch, such as artificial asphalt or blown oil, gum made from pine tar rosin, powdered lime, a solvent, such as petroleum naptha or coal-tar distillates, and slate dust, or other inert matter.

In preparing the composition I prefer to use the ingredients in about the following proportions—viz., one hundred pounds of pitch, one pound of gum, one-half-pound of powdered lime, one half pint of solvent, and sixty-two pounds of slate dust, or other inert matter.

These ingredients are mixed as follows: The pitch is heated in a tank and boiled one to three hours to remove the carbon, then drained into a pre-heated tank and the gum added. The slate dust, which has been previously heated to the same temperature as the pitch, is then added, then the lime and solvent are added and the whole thoroughly mixed. The mixture is then put through rollers and formed into sheets of the desired size and thickness.

The composition when cut into sheets or shingles is somewhat pliable and can be nailed in position on the building the same as any other shingle or roofing material, and the nails will be made waterproof and prevented from rusting by passing through the said composition.

I claim:

A composition adapted to be formed into shingles or sheets comprising one hundred pounds of pitch, one pound of gum, one-half pound of powdered lime, one-half pint of solvent, and sixty two pounds of slate dust, substantially as described.

In testimony whereof I affix my signature.

GEORGE L. SLEIGHT.